United States Patent [19]

Wilson et al.

[11] 3,786,294

[45] Jan. 15, 1974

[54] PROTECTIVE COATING FOR DIODE ARRAY TARGETS

[75] Inventors: Ronald H. Wilson; Samuel M. Blumenfeld; Rowland W. Redington; Joseph S. Rosczak, all of Schenectady, N.Y.

[73] Assignee: General Electric Company, Schenectady, N.Y.

[22] Filed: Feb. 22, 1971

[21] Appl. No.: 117,313

[52] U.S. Cl. .......... 313/65 AB, 313/66, 317/235 NA

[51] Int. Cl. .......... H01j 31/28

[58] Field of Search .......... 313/65 AB, 66, 317/235, 317/235 AK

[56] References Cited

UNITED STATES PATENTS

| | | | |
|---|---|---|---|
| 3,011,089 | 11/1961 | Reynolds | 313/65 AB X |
| 3,548,233 | 12/1970 | Cave et al. | 313/65 AB |
| 3,664,895 | 5/1972 | Schaefer et al. | 317/235 |
| 3,668,473 | 6/1972 | Miyashiro | 317/235 |
| 3,437,890 | 4/1969 | Krohl et al. | 317/235 |
| 3,585,430 | 6/1971 | Simon et al. | 314/65 AB |
| 3,258,434 | 6/1966 | Mackenzie et al. | 313/65 T X |
| 3,419,746 | 12/1968 | Crowell et al. | 313/65 AB |

FOREIGN PATENTS OR APPLICATIONS

| | | | |
|---|---|---|---|
| 2,020,355 | 11/1970 | Germany | 317/235 |
| 679,846 | 9/1952 | Great Britain | 313/66 |

*Primary Examiner*—Herman Karl Saalbach
*Assistant Examiner*—James B. Mullins
*Attorney*—Paul F. Wille, Joseph T. Cohen and Jerome C. Squillaro

[57] ABSTRACT

An improved coating for diode array targets is disclosed wherein a resistive sea is coated over the diode array. The resistive sea has a thickness of from 10 to 1000A and a resistivity of from 5 × $10^5$ to $10^9$ ohm-centimeters. The resistive sea comprises an electronically conductive borate glass containing an oxide of a metal, e.g. iron, vanadium, cobalt, etc. This layer has been found to serve a protective function and, in particular, serves to prevent an increase in the dark current of the array due to "aging" effects or due to vacuum baking of the array in preparation for use as an image intensifier.

6 Claims, 3 Drawing Figures

INVENTORS:
RONALD H. WILSON,
SAMUEL M. BLUMENFELD,
ROWLAND W. REDINGTON;
JOSEPH S. ROSCZAK
by Paul F. Wille
THEIR ATTORNEY

PROTECTIVE COATING FOR DIODE ARRAY TARGETS

This invention relates to diode array vidicon targets having an electronically conducting glass layer to leak charge to the diodes from the insulating layer between the diodes. The insulating layer shields the substrate from the scanning electron beam but, in so doing, accumulates charge which must be dissipated.

This application relates to application Ser. No. 833,111 filed June 13, 1969 by Schaefer et al. now U.S. Pat. No. 3,664,895 entitled "Camera Tube Diode Array Targets and Method of Forming," and assigned to the assignee of the present invention.

Typically, silicon diode array vidicon targets are formed from a wafer of n-type conductivity silicon having a multitude of p-type conductivity regions diffused partially therein through small apertures etched in an insulator overlying one face of the wafer. When an electron beam subsequently is scanned across the wafer face overlaid by the apertured insulator, the individual diodes formed by the p-type conductivity regions in the wafer are reverse biased by the beam and, in the absence of ionizing radiation impinging on the opposite face of the target to produce hole-electron pairs, the diodes remain in a substantially reverse biased condition until the electron beam again scans the diode.

At target locations where impinging photons effect a discharge of the diodes, a greater electron charge must be deposited by the beam to again reverse bias the diode and an output video signal is obtained by measuring current flow to the silicon wafer resulting from the electron beam deposited charge.

When the scanned electron beam is of sufficient diameter to simultaneously encompass a plurality of diodes, e.g. to minimize the presence of an inoperative diode in the target by redundency or when the electron beam is scanned over the insulated areas between the diodes, charge tends to collect on the insulator. This produces a field induced channel below the insulator which degrades the isolation between the p-type conductivity regions of adjacent diodes.

One technique heretofore employed to inhibit charge build-up on the apertured insulator has been the deposition of a metal, e.g. gold, atop both the p-type conductivity regions of the diodes and a portion of the adjacent insulator to conduct electron beam induced charge from the insulator to the p-type conductivity region of the target. The metal deposition technique however requires precise registration between the deposited metal dots and the underlying p-type conductivity regions of the target to inhibit shorting of adjacent diodes.

Because of the registration problems associated with charge drain by a metallic conductor overlying each p-type conductivity region of the target, it has been proposed, e.g. in U.S. Pat. No. 3,419,746, that a semiconductive insulating layer having a discharge time constant greater than the period of the scanning electron beam and less than the relaxation time of the apertured insulator be deposited over the entire electron beam bombarded surface of the target to leak charge from the insulator to the p-type conductivity regions of the target without shorting adjacent diodes. Among the materials suggested as being suitable for this purpose are silicon monoxide, antimony trisulfide, cadmium sulfide, zinc sulfide, arsenic trisulfide, antimony trisulfide, arsenic triselenide, nickel oxide, and mixtures of the foregoing as well as co-evaporated films of silicon dioxide and gold.

The suggested materials, however, are characteristically of a fixed resistivity, negating wide flexibility in such design criteria as the required thickness of the semiconductive insulating layer to discharge the underlying apertured insulator within the required time period. Moreover, many of the heretofore proposed semiconductive insulating layer materials, e.g. antimony trisulfide, lack stability under electron beam scanning and are subject to "raster burn," i.e. a change in the characteristics of the layer in the scanned region. Thus, if the scanned area of the target is increased to enlarge the picture scope, the previously scanned center region of the diode array target produces an output signal differing from the surrounding previously unscanned border for light impingement of a given intensity thereby producing a border in the displayed image. Similarly, bake-out of the target in a vacuum at temperatures substantially above 200°C often has been found to adversely affect the operative characteristics of prior art diode array targets.

In addition to the more typical diode array vidicon targets described above, the conductive glass layer of the present invention can, under certain circumstances, enhance the performance of epitaxially grown target arrays. Epitaxially grown target arrays are more fully described by W. E. Engeler in application Ser. No. 845,435, filed July 28, 1969 now abandoned, and assigned to the assignee of the present invention. In the aforementioned application, the target comprises an array of closely spaced diodes, with electrically conducting, self-registered projections thereon. While these targets are mass produced with a relatively high yield of quality targets, it has been found that targets of this type may be further improved, i.e. rendered insensitive to aging effects and produce a more uniform response, by utilizing a coating in accordance with the present invention.

A small number of epitaxially grown targets may exhibit improper geometry with the result that a greater area of insulating material is exposed to the electron beam. This renders the insulator susceptible to aging effects as well as storing a greater amount of charge from the electron beam, thereby producing a non-uniform response.

The aging phenomenon is not fully understood but is generally ascribed to the generation of x-rays in the vidicon at the grid adjacent the target and interposed between the target and the source of electrons. The aging effect is manifested by an increase in the dark current of the target.

As with conventional targets, the vacuum baking in the tube of epitaxially grown target arrays for use as image intensifiers, even those targets of proper geometric proportions, can degrade the electrical characteristics of the target by increasing the dark current. Previously, this situation has been corrected by a subsequent anneal in a hydrogen bearing atmosphere to reduce the dark current. The hydrogen anneal, however, is a cumbersome procedure that is desirable to avoid at this stage of the fabrication of these tubes.

In view of the foregoing, it is, therefore, an object of the present invention to provide an improved diode target array having a resistive sea coating.

A further object of the present invention is to provide an improved diode target array having greater resistance to aging effects.

Another object of the present invention is to provide an improved diode target array having improved resistance to increases in dark current upon vacuum baking.

A further object of the present invention is to provide a thin resistive sea for diode target arrays to dissipate charge accumulating between diodes in the array.

Another object of the present invention is to provide a resistive sea whose thickness and resistivity can be independently varied.

A further object of the present invention is to provide a thin borate glass resistive sea for diode target arrays.

Another object of the present invention is to provide a resistive sea for improving the uniformity of response of epitaxial target arrays.

The foregoing objects are achieved by the present invention in which a diode array target has applied thereover a thin resistive sea to leak charge from the apertured insulator to the diode regions of the semiconductive wafer forming the target. Thus, a diode array target in accordance with this invention generally includes a semiconductive wafer of first conductivity type having a multitude of regions of second conductivity type extending through one face of the wafer to form a multitude of diodes within the wafer. Suitable insulating material extends between adjacent second conductivity type regions and overlies the first conductivity type regions of the water surface to shield the first conductivity regions from impingement by an electron beam scanned across the target to reverse bias the individual diodes formed in the target.

To inhibit charge build-up on the insulating material, which tends to degrade the isolation between adjacent diodes, a 10–1000A layer of resistive sea having a discharge time constant greater than the period of the scanning beam and less than the relaxation time of the insulating material overlies both the insulating means and the exposed second conductivity type regions of the target. A suitable resistive sea comprises an electrically conductive glass is characterized by a room temperature resistivity between $5 \times 10^5$ and $10^9$ ohm-cm with the particular value dependent on the desired resistive sea thickness. Alkaline earth metal borate glasses containing at least 15 mole percent of a metal oxide providing metal ions of a higher valence state and lower valence state are highly suitable for utilization in this invention.

A diode array target having a protective resistive sea can be made by depositing a glass layer over the target preferably by R.F. sputtering in a gaseous pressure between 1 and 100 microns. Thus, for a conventional target, the target is initially fabricated in conventional fashion by preparing a silicon substrate of a first conductivity type and forming an insulating layer atop one face of the substrate, e.g. by thermal oxidation, whereupon the insulator is etched to provide a plurality of apertures through which apertures a suitable impurity is diffused to form regions of a second conductivity type extending partially into the substrate. The substrate then is positioned within a suitable deposition chamber and a layer of electrically conductive glass having a room temperature resistivity between $5 \times 10^5$ and $10^9$ ohm-cm is deposited over the apertured insulator to electrically contact both the insulator and the second conductivity type regions of the substrate. Preferably the deposition of the electrically conductive glass is accomplished by R.F. sputtering in an atmosphere selected to produce a desired resistivity in the glass, e.g. sputtering in an argon atmosphere has a negligible effect on resistivity while sputtering in an oxygen or nitrogen containing atmosphere produces an increase and decrease, respectively, in the resistivity of the deposited glass.

When the glass resistive sea of the present invention is used with an epitaxially grown target, the procedure as described in the above-noted copending application, Ser. No. 845,435, is utilized. That is, a substrate of first conductivity type semiconductive material is coated on one side with an apertured insulating layer such as silicon dioxide. The apertures can be formed by photographically etching the insulating layer to expose selected regions of the underlying substrate. Semiconductive material of a second conductivity type is then selectively epitaxially grown through the apertures and above and along the insulating layer until projections of the second type conductivity material result. The projections thus formed extend over the insulator and almost touch one another. The glass resistive sea is then applied as described above.

The present invention may be more fully understood by reference to the following detailed description, taken in connection with the accompanying drawings, in which.

Figure 1:
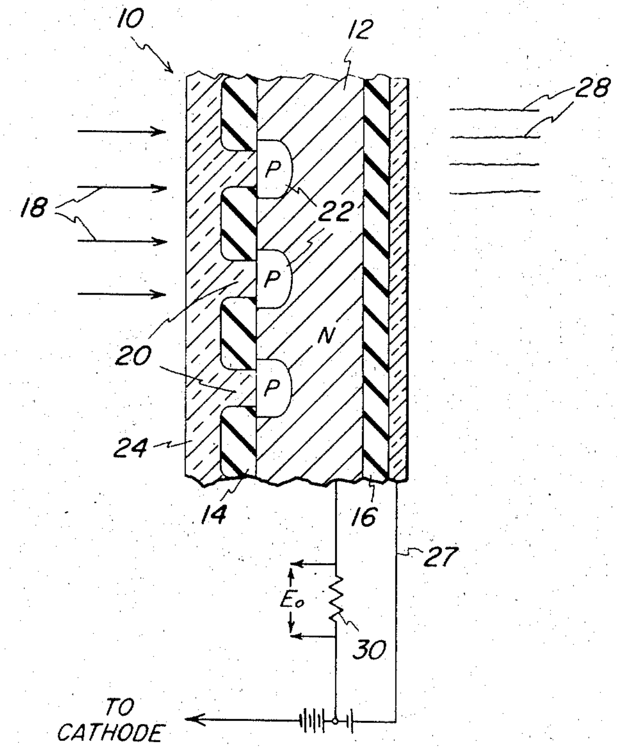
FIG. 1 is a sectional view of a diode array camera tube target constructed in accordance with this invention.
Figure 2:
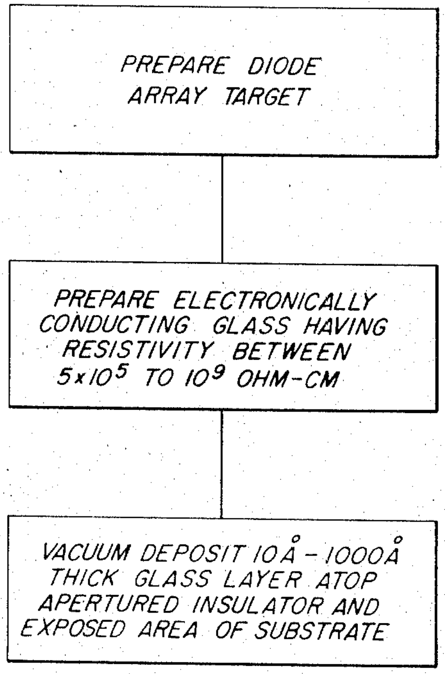
FIG. 2 is a flow chart illustrating in block diagram form a method of fabricating the diode array targets of this invention.

A specific embodiment of a diode array target in accordance with this invention is depicted in FIG. 1 and generally includes a thin, e.g. less than 4-mil thick, n-type silicon substrate 12 having approximately 5,000A thick oxide surface layers 14 and 16 thermally grown atop the major faces of the substrate. Oxide layer 14, disposed proximate a scanning electron beam illustrated by arrows 18 during operation, is photoetched to form a multitude, e.g. $10^6$ per sq. inch, of apertures 20 in the oxide layer and a suitable dopant, such as boron, is diffused through apertures 20 into the silicon wafer in conventional fashion, e.g. from a boron doped glass, to form discrete p-regions 22 in the n-type substrate. During diffusion of the boron into substrate 12, the boron also diffuses laterally to extend the p-regions under oxide layer 14 to insure a complete shielding of the n-type region of the substrate from electron beam 18 during scanning.

A 10–1000A thick electrically conductive glass then is deposited as a homogeneous layer 24 atop apertured oxide layer 14 and a portion of the glass layer extends into apertures 20 to electrically contact p-regions 22 to permit charge to drain from the oxide layer to adjacent p-regions of the target. In one version of the diode array target, the face of substrate 12 remote from the electron beam is provided with a light transparent, e.g. 200A thick, metallic electrode 26 positively biased relative to the electron beam generating cathode (not shown) through lead 27 to increase the discharge rate of the diodes forming the target upon light impingement thereon. In another version, this surface is prepared with a thin $n^+$ layer and an anti-reflection coating for the same purpose.

In operation, an electron beam of a diameter encompassing a plurality of p-regions 22 is scanned across glass layer 24 and the electrons penetrate into the unshielded p-regions to reverse bias the individual diodes formed by each p-region in the n-type substrate. Because the dark current of the diodes is very small during the interval between identical scan patterns, a subsequent scan of the diodes by the electron beam requires only a relatively small deposited electron charge to restore the diode to a reverse biased condition. In an area of the substrate surface where ionizing radiation 28, e.g. photons, impinge to produce hole-electron pairs, the adjacent diodes require a greater electron charge during a subsequent scan to be restored to a reverse biased condtion and the electron charge absorbed at diverse locations along the target is measured by resistor 30 connected to silicon substrate 12 to provide an output video signal from the target.

Figure 3:
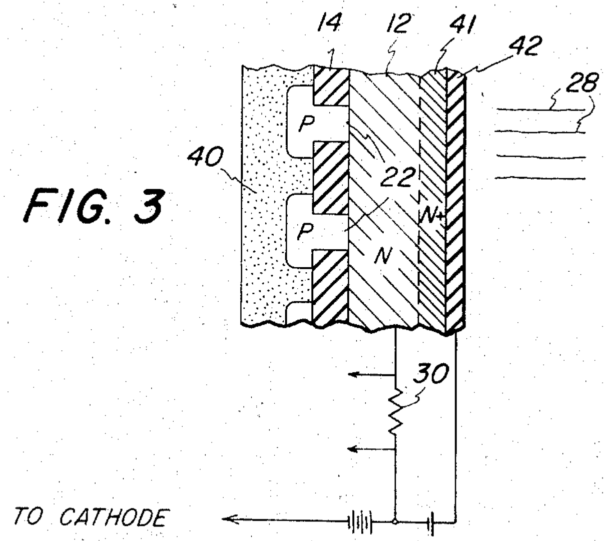
FIG. 3 is a sectional view of an epitaxial diode array in accordance with the present invention.

In FIG. 3 there is illustrated an alternative embodiment of the present invention in which an epitaxially formed diode array is coated with a resistive sea. Specifically, n-type semiconductor wafer 12 has deposited thereover an insulating layer 14 containing a plurality of apertures. A p-type conductivity regions is then epitaxially grown in each of the apertures so that it extends above insulating layer 14 and overlies a portion thereof. Resistive sea layer 40 is then deposited over insulating layer 14 and protruding regions 22. On the side of the target facing radiation 28, an $n^+$ layer 41 is formed covering wafer 12 and having an anti-reflection coating 42 applied thereover.

In operation, the embodiment of FIG. 3 functions similarly to that of FIG. 1. That is, the increased current necessary to restore irradiated diodes to a reversed biased condition is monitored and read out as an output signal across resistance 30. The exact mechanism by which resistive sea 40 protects the target is not fully understood. However, the application of a resistive sea, either semiconducting insulator or glass, prevents increases in dark current due to aging effects or vacuum baking and also improves the uniformity of response of the target.

Resistive sea 40 can comprise semiconducting insulating materials or electrically conductive glasses having a resistivity between $5 \times 10^5$ and $10^9$ ohm-cm. For example, borate glasses characterized by 20–40 mole percent of an alkaline earth metal oxide and at least 15 mole percent of an oxide of a metal selected from the group consisting of chromium, iron, antimony, vanadium, titanium, nickel, cobalt, manganese, molybdenum, tungsten, arsenic and mixtures thereof can be utilized. Each of the metal oxides in the latter group provide metal ions of higher valence state and lower valence state dependent upon both the materials and fabrication techniques employed to fabricate the glass.

While a preferred embodiment of the present invention has been shown and described, it is obvious to those skilled in the art that modifications may be made within the spirit and scope of the present invention. For example, while an n-type substrate has been shown, a p-type substrate with n-type regions formed in the apertures of the insulating layer, can also be utilized. Further, while alkaline earth metal borate glasses are preferred, other electrically conductive glasses can be used; for example, mangano-silicate and silica-free lithium borate glasses

What we claim as new and desire to secure by Letters Patent of the United States is:

1. A diode array target comprising:

a semiconductor wafer of a first conductivity type;

an insulating layer overlying said semiconductor layer and having a multitude of apertures therein exposing said semiconductor wafer underneath;

a multitude of regions of a second conductivity type extending through, above and overlying portions of said insulating layer; and a resistive sea overlying said insulating layer and said multitude of regions for forming a conductive path from said insulating layer to said multitude of regions and protecting the underlying layers and regions.

2. A diode array target as set forth in claim 1 wherein said resistive sea comprises a electrically conductive glass.

3. A diode array target as set forth in claim 1 wherein said resistive sea comprises a layer of electrically conductive glass 10–1000A thick.

4. A diode array target comprising:

a semiconductive wafer of a first conductivity type;

an insulating layer overlying the surface of said wafer and containing a plurality of apertures;

a multitude of regions of second conductivity type intersecting said surface of said semiconductive wafer to form a multitude of junctions therewith, said regions extending through said apertures and overlying portions of said insulating layer; and a layer of electrically conductive glass 10–1000A thick deposited atop said target for dissipating charge stored in said insulating layer, minimizing changes in dark current of the target, and improving the uniformity of response of said diode array target.

5. A diode array target according to claim 4 wherein said glass is an electronically conducting borate glass having a room temperature resistivity between $5 \times 10^5$ and $10^9$ ohm-cm.

6. A diode array target according to claim 5 wherein said glass contains 20 to 40 mole percent of an alkaline earth metal oxide and an oxide of a metal selected from the group consisting of chromium, iron, antimony, vanadium, titanium, nickel, cobalt, manganese, molybdenum, tungsten, arsenic and mixtures thereof, said oxide of the selected metal being present in the glass in an amount of at least 15 mole percent on the basis of the alkaline metal earth boron content of the glass and providing in the glass metal ions of a higher valence state and a lower valence state.

* * * * *